United States Patent
Bergmann (10) Patent No.: US 10,047,734 B2
(45) Date of Patent: Aug. 14, 2018

(54) HYDROSTATIC AXIAL PISTON MACHINE

(71) Applicant: Linde Hydraulics GmbH & CO. KG, Aschaffenburg (DE)

(72) Inventor: Martin Bergmann, Schaafheim (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 414 days.

(21) Appl. No.: 14/335,964

(22) Filed: Jul. 21, 2014

(65) Prior Publication Data
US 2015/0075362 A1 Mar. 19, 2015

(30) Foreign Application Priority Data
Aug. 5, 2013 (DE) .................. 10 2013 108 407

(51) Int. Cl.
*F04B 53/18* (2006.01)
*F04B 1/20* (2006.01)
*F04B 1/14* (2006.01)
*F16C 33/66* (2006.01)

(52) U.S. Cl.
CPC ............ *F04B 1/2085* (2013.01); *F04B 1/148* (2013.01); *F04B 53/18* (2013.01); *F16C 33/6662* (2013.01); *F16C 33/6681* (2013.01); *F16C 2360/00* (2013.01)

(58) Field of Classification Search
CPC ..... F16C 33/6659; F04B 1/2085; F04B 53/18
See application file for complete search history.

(56) References Cited

U.S. PATENT DOCUMENTS

| | | | |
|---|---|---|---|
| 2,570,698 A | 10/1951 | Manseau | |
| 3,940,191 A * | 2/1976 | Tomioka | B21B 31/076 384/468 |
| 4,400,040 A * | 8/1983 | Toth | F16C 19/364 384/465 |
| 4,425,011 A * | 1/1984 | Cunningham | F16C 19/364 384/571 |
| 5,419,130 A | 5/1995 | Ruckgauer et al. | |
| 7,500,311 B2 * | 3/2009 | Shimomura | F16C 19/26 184/7.4 |
| 2003/0206811 A1 | 11/2003 | Maki et al. | |
| 2008/0089632 A1 * | 4/2008 | Matsuyama | F16C 33/58 384/571 |

FOREIGN PATENT DOCUMENTS

| | | |
|---|---|---|
| CN | 102155368 A | 8/2011 |
| DE | 4128615 C1 | 1/1993 |
| DE | 19829060 A1 | 1/2000 |
| DE | 102009051674 A1 | 5/2011 |

* cited by examiner

*Primary Examiner* — F. Daniel Lopez
(74) *Attorney, Agent, or Firm* — The Webb Law Firm (57) ABSTRACT

A hydrostatic axial piston machine (1) has a housing (2), a rotatable drive shaft (4) mounted in the housing (2) by a bearing device (5) that comprises at least one roller bearing (5a; 5b), a cylinder drum (7) having at least one piston bore (8), and a longitudinally displaceable piston (10) in each piston bore. A spray jet lubrication system (50) for the roller bearing (5a; 5b) includes at least one lubricant spray jet (51a; 51b) directed toward the area of an axial edge (30; 32) of an inner ring (5c; 5d) of the roller bearing (5a, 5b) with which the roller bodies of the roller bearing (5a, 5b) are in contact via an end surface.

13 Claims, 7 Drawing Sheets

HYDROSTATIC AXIAL PISTON MACHINE

CROSS REFERENCE TO RELATED APPLICATION

This application claims priority to German Application No. DE 102013108407.9 filed Aug. 5, 2013, which is herein incorporated by reference in its entirety.

BACKGROUND OF THE INVENTION

Field of the Invention

This invention relates to a hydrostatic axial piston machine with a housing; a drive shaft mounted so that it can rotate in the housing by a bearing device comprising at least one roller bearing; and a cylinder drum provided with at least one piston bore, with a longitudinally displaceable piston in each of the piston bores.

Description of Related Art

In hydrostatic axial piston machines, as a rule, the housing (inside of which the rotating drive shaft and the rotating cylinder drum are located) is filled with pressure medium, in particular hydraulic fluid, to provide cooling and lubrication. During operation of the axial piston machine, the rotating drive shaft and the rotating cylinder drum cause churning losses to occur, which increase extra-proportionally as the speed of rotation increases. These churning losses represent additional energy consumption which, in an axial piston machine in the form of a pump, represent an undesirable dissipation of energy which must be made up by the drive and in an axial piston machine in the form of a motor, are not available as output power. Especially at high speeds of rotation of the rotating components, this power loss can be on a significant order of magnitude, and as a result of which, the potential performance and utility of the axial piston machine can be restricted and limited at high speeds of rotation.

To overcome these disadvantages, it is known that the housing of a hydrostatic axial piston machine can be emptied of hydraulic fluid to reduce the losses caused by the churning of the rotating components and to increase the efficiency of the axial piston machine at high speeds of rotation.

However, in a hydrostatic axial piston machine in which the hydraulic fluid has been emptied from the housing, care must be taken to provide adequate lubrication and cooling of the roller bearings of the bearing device of the drive shaft. To guarantee adequate lubrication of the roller bearings of the drive shaft of the hydrostatic axial piston machine, DE 41 28 615 C1 and DE 198 29 060 B4 teach that a lubricant channel can be provided that carries the flow of lubricant and which is routed through all the roller bearings of the bearing device of the drive shaft.

To guarantee a uniform lubrication of the roller bearings with a lubricant channel of this type that is routed through the roller bearings, DE 198 29 060 B4 provides a back pressure device that dams up the lubricant in the lubricant passage at the roller bearing facing the cylinder drum. For this purpose, in DE 198 29 060 B4 the back pressure device is located downstream of the roller bearings of the bearing device in the lubricant channel. The roller bearing facing the cylinder drum and the axial edge located on the inner ring of this roller bearing with which the roller bodies of this roller bearing are in contact with their end surface is, thereby, lubricated and cooled with lubricant that has already been heated by the heat given off by the two roller bearings of the bearing device. As a result, adequate lubrication and cooling of the axial edge of the roller bearing facing the cylinder drum are not guaranteed.

Therefore, it is an object of this invention to provide an axial piston machine of the general type described above with a housing that has been emptied of hydraulic fluid but in which improved lubrication and cooling of the roller bearing are achieved in the vicinity of the axial edge of the inner ring of the roller bearing on the end surfaces of the roller bodies of the roller bearing.

SUMMARY OF THE INVENTION

To accomplish this object, a spray jet lubrication system is provided for the roller bearing. The lubrication system comprises at least one spray jet of lubricant directed toward the area of one axial edge of an inner ring of the roller bearing with which the roller bodies of the roller bearing are in contact by an end surface. On the roller bearings of the drive shaft of an axial piston machine, the areas of the axial edges on the inner rings with which the roller bodies of the roller bearing are in contact with their end surfaces are important in terms of lubrication and friction because high levels of friction occur between the axial edges on the inner rings of the roller bearings and the end surfaces of the roller bearings. With a spray jet lubrication system that has at least one spray jet of lubricant directed toward the area of the axial edge of the inner ring of the roller bearing and the end surfaces of the roller bodies with which it is in contact, the tribologically highly stressed (i.e., with respect to friction, lubrication, and wear) axial edge on the inner ring of the roller bearing is reliably and effectively lubricated and cooled with a spray jet of lubricant directed toward this location. In an axial piston machine with a housing that has been emptied of hydraulic fluid, adequate lubrication and cooling of the roller bearings of the drive shaft in the tribologically highly stressed axial edges of the inner ring can thereby be guaranteed in a simple manner.

It is particularly advantageous if, as in one embodiment of the invention, the spray jet lubrication system is located near or adjacent to an axial edge of the roller bearing that faces the rotating cylinder drum. In axial piston machines, strong forces occur on the axial edge of the roller bearing that faces the cylinder drum on account of the axial forces of the piston machine that must be absorbed there. A spray jet lubrication system makes it possible to provide adequate lubrication and cooling at this point of the roller bearing that absorbs the axial load of the axial piston machine with little added construction effort and expense.

It is particularly advantageous if, as in one development of the invention, the spray jet lubrication system has a plurality of lubricant spray jets over the periphery of the inner ring of the roller bearing directed toward the axial edge of the inner ring of the roller bearing. In this manner, adequate lubrication and cooling over the periphery of the axial edge of the roller bearing can be provided with little added construction effort or expense.

In one advantageous embodiment of the invention, the plurality of lubricant spray jets can be distributed evenly over the periphery. In other words, viewed over the periphery, the individual lubricant spray jets are distributed at equal angular degrees.

In an alternative, particularly advantageous embodiment of the invention, the plurality of lubricant spray jets are distributed unevenly over the periphery. In other words, viewed over the periphery, at least some of the individual lubricant spray jets are distributed at different angular degrees with respect to the other spray jets. It consequently becomes possible to adapt the spray jet lubrication to the stress on the roller bearing. The lubricant spray jets can be located closer together in angular areas that are subjected to greater stress, and the individual lubricant spray jets can be located farther apart in areas where the stress is lower.

It is particularly advantageous to generate the lubricant spray jet if, as in one development of the invention, a boring is provided that points toward the axial edge of the inner ring of the roller bearing and is in communication with a lubricant supply connection of the housing. With a boring of this type, a lubricant spray jet for lubrication and cooling can be formed that is directed toward the axial edge of the inner ring of the roller bearing and, thus, toward the tribologically highly stressed point of the rolling bearing between the end surface of the roller bodies and the axial edge of the inner ring of the roller bearing, with little added construction effort and expense. The direct communication between the boring and a lubricant supply connection of the housing makes it possible to direct a lubricant spray jet with cold lubricant from the lubricant supply connection via the boring toward the axial edge of the inner ring of the roller bearing, and as a result of which, efficient cooling and lubrication of the roller bearing is achieved with a small quantity of lubricant in the tribologically highly stressed area of the roller bearing between the end surface of the roller bodies and the axial edge on the inner ring.

In one preferred embodiment of the invention, the boring has a circular cross-section. A circular cross-section generates an essentially corresponding lubricant jet with a circular cross-section.

In one alternative embodiment of the invention, the boring has a non-circular cross-section, such as a slot-shaped cross-section that is oriented in the peripheral direction. With a non-circular cross-section, such as a slot-shaped or kidney-shaped cross-section of the boring oriented in the peripheral direction, a lubricant spray jet with a fan-shaped cross-section, which covers an enlarged angular area on the axial edge of the inner ring can be generated. This makes it possible to achieve advantages in terms of an effective cooling and lubrication of the axial edge on the inner ring of the roller bearing.

With regard to the goal of minimizing the requirement for additional construction effort and expense for the spray jet lubrication system, it is advantageous if, as in one embodiment of the invention, the boring is located in a ring bushing located in the housing. This makes possible, via a ring channel, a connection between the boring and the lubricant supply connection of the housing. The borings for the spray jet lubrication can be easily and economically created in a ring bushing. The individual borings of the ring bushing can be easily connected with the lubricant supply connection by a ring channel and the lubricant available at the lubricant supply connection can be distributed to the individual borings in the ring bushing.

In one preferred embodiment of the invention, the hydrostatic axial piston machine has a lubricant channel routed through the bearing device. The lubrication of the bearing device is preferably in the form of basic lubrication of the bearing device by the lubricant channel that is routed through the bearing device. With a lubrication system of this type, at high speeds of rotation, the outer rings of the roller bearings are essentially wetted with lubricant. In connection with the spray jet lubrication system of the invention on the axial edge of the inner ring of the roller bearing, it is thereby possible to reliably prevent inadequate lubrication on the axial edge of the inner ring of the roller bearing.

The lubricant channel is preferably connected with the lubricant supply connection of the housing.

The axial piston machine of the invention can be in the form of a swashplate machine.

Alternatively, the axial piston machine can be in the form of a bent-axis machine. On an axial piston machine utilizing the bent-axis construction, the roller bearings of the drive shaft are subjected to high stresses by the high axial forces originating from the pressurized pistons. On an axial piston machine utilizing the bent-axis construction, high stress is exerted on the roller bearing that faces the cylinder drum and is oriented toward the cylinder drum, which absorbs the high axial forces from the pressurized pistons and bears the axial load. With the spray jet lubrication system of the invention on the axial edge facing the cylinder drum of the inner ring of the roller bearing facing the cylinder drum, a targeted lubrication and cooling of the most highly stressed point of the roller bearing system of the drive shaft can be achieved.

BRIEF DESCRIPTION OF THE DRAWINGS

Additional advantages and details of the invention are explained in greater detail below with reference to the exemplary embodiments illustrated in the accompanying schematic figures, in which like reference numbers identify like parts throughout.

DESCRIPTION OF THE PREFERRED EMBODIMENTS

Figure 1:
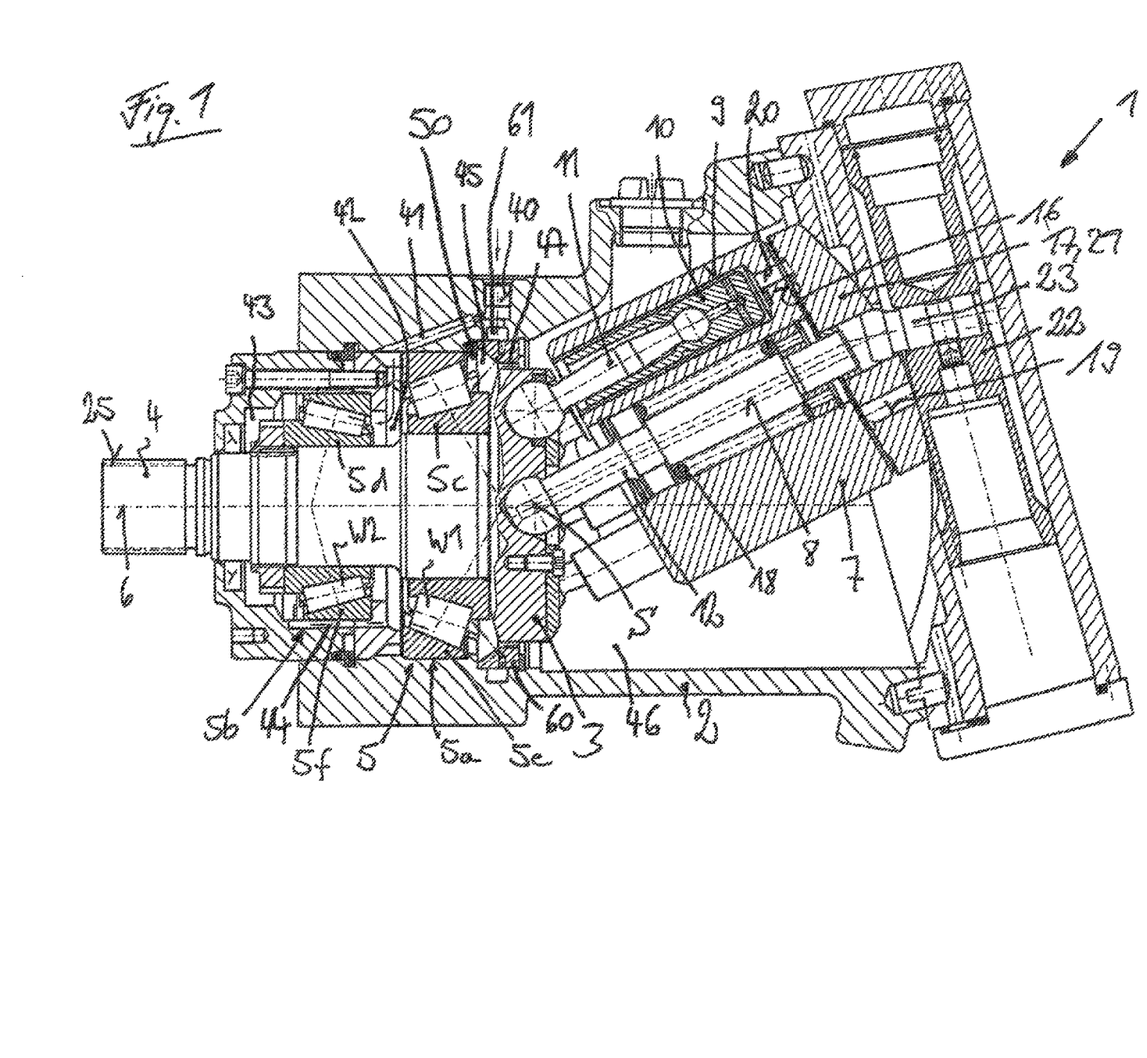
FIG. 1 is a longitudinal section of an axial piston machine of the invention.
Figure 2:
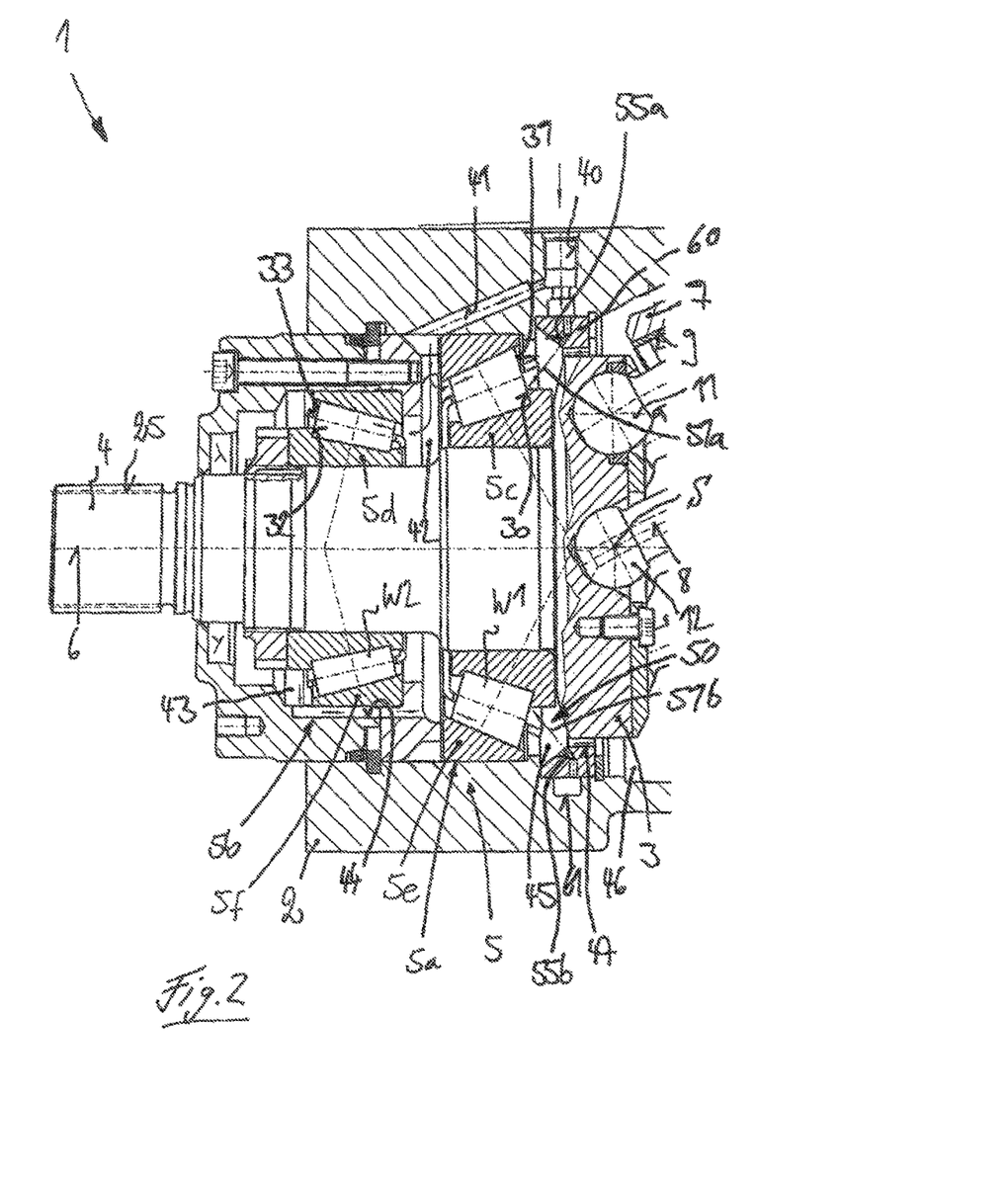
FIG. 2 is an enlarged illustration of a detail from FIG. 1.
Figure 3:
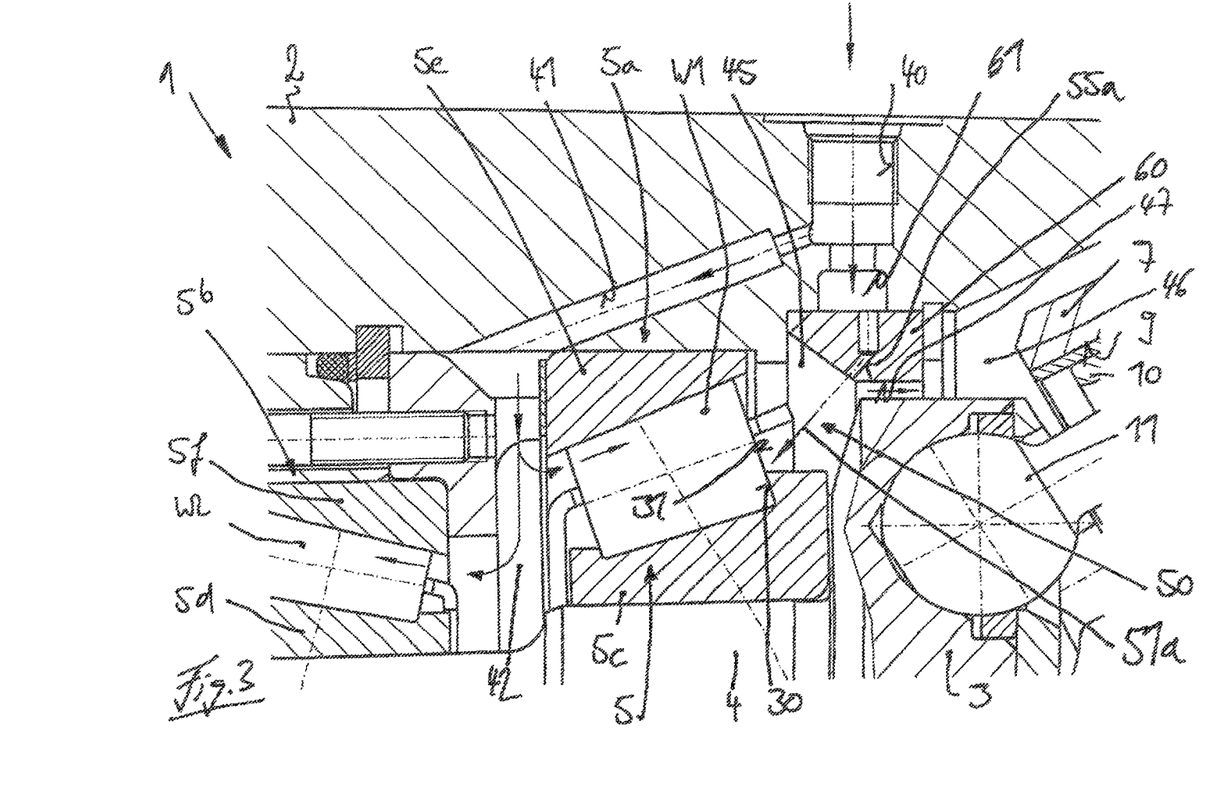
FIG. 3 is an additional enlarged illustration of the detail from FIGS. 1 and 2.

FIGS. 1 to 3 show a longitudinal section of a hydrostatic axial piston machine 1 of the invention utilizing a bent-axis construction. The axial piston machine 1 has a housing 2, in which a drive shaft 4 provided with a drive flange 3 is mounted by a bearing device 5 so that the drive shaft 4 can rotate around an axis of rotation 6.

Axially next to the drive flange 3 there is a cylinder drum 7 having a plurality of piston bores 9 arranged concentrically around an axis of rotation 8 of the cylinder drum 7. A longitudinally movable piston 10 is located in each piston bore 9.

The pistons 10 are each connected by a connecting rod 11 with the drive flange 3. The connecting rod 11 is connected in an articulated manner both to the piston 10 as well as to the drive flange 3, such as by a ball-and-socket joint. The cylinder drum 7 is supported on a trunnion 12, which is connected in an articulated manner with the drive flange 3 by a ball-and-socket joint. A spring 18 is also supported on the trunnion 12. The spring 18 presses the cylinder drum 7 against a control body 17, which is provided with a control surface 16. The trunnion 12 is located concentrically with respect to the axis of rotation 8 of the cylinder drum 7.

In the control surface 16 of the control body 17, for control of the feed and discharge of hydraulic fluid in the displacement chambers formed by the piston bores 9 and the pistons 10, there are kidney-shaped control bores that form an inlet connection 19 and an outlet connection of the axial piston machine 1. For connection of the displacement chambers formed by the piston bores 9 and the pistons 10 with the control bores located in the control body 17, the cylinder drum 7 is provided with a control aperture 20 at each piston bore 9.

The axial piston machine 1 illustrated in FIGS. 1 to 3 is in the form of a variable displacement machine with a variable displacement volume. In a variable displacement machine, the angle of inclination of the axis of rotation 8 of the cylinder drum 7 can be varied with respect to the axis of rotation 6 of the drive shaft 4 to vary the displacement volume. For this purpose, the control body 17 provided with the control surface 16 is provided on a rocker body 21 located in the housing 2 so that it can swivel around a swivel axis S. The swivel axis S of the rocker body 21, and, therefore, of the cylinder drum 7, lies on the intersection S of the axis of rotation 6 of the drive shaft 4 and the axis of rotation 8 of the cylinder drum 7 and is perpendicular to the axes of rotation 6 and 8.

To vary the inclination of the rocker body 21, and, thus, of the cylinder drum 7, a control device 22 formed by a control piston is provided which is in an operative connection with the rocker body 21. For this purpose, the control device 22 is provided with a connecting lug 23, which is connected in an articulated manner with the rocker body 21.

In FIGS. 1 to 3, the drive shaft 4 provided with the drive flange 3 is mounted in a cantilever fashion in the housing 2 by the bearing device 5. The bearing device 5 comprises two roller bearings 5a, 5b, which are located in the axial direction between the drive flange 3 and a shaft stub of the drive shaft 4 that projects out of the housing 2. On the shaft stub that projects out of the housing 2, the drive shaft 4 is provided with torque transmission means 25, such as a spline, for example. The roller bearing 5a is oriented facing the cylinder drum 7. The roller bearing 5b is oriented so that it faces the shaft end of the drive shaft 4 that projects out of the housing 2.

The roller bearings 5a, 5b are each taper roller bearings, which include a drive shaft side inner ring 5c, 5d, housing side outer ring 5e, 5f, and roller bodies W1, W2 in the form of tapered rollers located between the respective inner rings 5c, 5d and outer rings 5d, 5f.

The roller bearings 5a, 5b are located in an O-arrangement, in which the roller bodies W1, W2 of the roller bearings 5a, 5b are inclined inwardly and outwardly, respectively, with respect to the axis of rotation 6 of the drive shaft 4.

The inner ring 5c of the cylinder drum side roller bearing 5a has an axial edge 30 facing the cylinder drum 7, on which axial edge 30 the roller bodies W1 of the roller bearing 5a are supported via an end surface 31.

The inner ring 5d of the shaft end side roller bearing 5b has an axial edge 32 facing the shaft end of the drive shaft 4, on which axial edge 32 the roller bodies W2 of the roller bearing 5b are supported via an end surface 33.

In the axial piston machine 1 of the invention, the housing 2 is void of pressurized fluid, such as hydraulic fluid, to prevent churning losses caused by the rotating components during operation of the axial piston machine 1. For lubrication and cooling of the bearing device 5, formed by the two roller bearings 5a, 5b of the drive shaft 4, a basic lubrication system is provided, which is formed by a lubricant channel that is routed through the bearing device 5. The lubricant channel is formed by a channel 41 routed from a lubricant supply connection 40 on the housing 1 to an annulus 42 (central annulus) between the two roller bearings 5a, 5b; a shaft end side annulus 43 on the roller bearing 5b, which is connected via a return channel 44 in the vertically lower area of the roller bearing 5b with the annulus 42; a cylinder drum side annulus 45 between the roller bearing 5a, the drive flange 3 and the housing 2; a discharge (outflow) opening 47 that connects the drum side annulus 45 with the housing interior 46; and a lubricant outlet on the housing 2 (not illustrated in detail in FIGS. 1 to 3). The lubricant outlet is preferably located at the lowest vertical point of the housing 2.

From the annulus 42 connected with the lubricant supply connection 40 by the channel 41, a lubricant (such as lubricating oil) flows from the central annulus 42 via the roller bodies W2 of the roller bearing 5b and the return channel 44 back into the annulus 42, for which purpose the lubricant channel is routed through the roller bearing 5b. From the annulus 42, the lubricant likewise flows via the roller bodies W1 of the roller bearing 5a into the drum side annulus 45 and via the discharge opening 47 to the housing interior 46 and, thus, to the lubricant outlet, for which purpose the lubricant channel is routed through the roller bearing 5b. The direction of flow of the lubricant in the lubricant channel 41-47 is indicated by flow arrows in the figures. At high speeds of rotation of the axial piston machine 1, as a result of the basic lubrication and the lubricant channel that is routed through the bearing device 5, the outer rings 5e, 5f of the roller bearings 5a, 5b are wetted with lubricant as a result of the centrifugal forces that occur. A shortage of lubricant can occur on the axial edges 30, 32 of the inner rings 5c, 5d of the roller bearings 5a, 5b.

In the axial piston machine illustrated in FIGS. 1 to 3 utilizing the bent-axis construction, the axial forces generated by the pressurized pistons 10 and which are transmitted by the connecting rod 11 to the drive flange 3, are primarily absorbed by the cylinder drum side roller bearing 5a, which bears the axial load. The axial load is essentially borne by the roller bodies W1, which are oriented at an inclination. A force component, which when the roller bodies are designed as tapered rollers results from the tapered shape of the roller bodies W1, is supported on the axial edge 30 facing the cylinder drum 7 on the inner ring 5c of the roller bearing 5a. A high level of friction occurs between the axial edge 30 on the inner ring 5c and the end surface 31 of the roller bodies W1 of the roller bearing 5a. The axial edge 30 on the inner ring 5c of the roller bearing 5a is consequently subjected to high tribological stress and represents the most highly stressed point of the bearing device 5. In the event of a lack or shortage of lubricant, the magnitude of the force component supported on the axial edge 30 is important.

To provide effective lubrication and cooling at this point, in addition to the basic lubrication by the lubricant channel 41-47 that runs through the bearing device 5, a spray jet lubrication system 50 for the roller bearing 5a is provided. The spray jet lubrication system 50 (illustrated particularly in FIGS. 2 and 3) comprises at least a targeted lubricant spray jet 51a, 51b aimed at an area near or adjacent to the axial edge 30 of the inner ring 5c of the roller bearing 5a with which the roller bodies of the roller bearing 5a are in contact by the end surface 31. The spray jets 51a, 51b are, thus, targeted toward the tribologically most highly stressed point between the end surfaces 31 of the roller bodies W1 and the axial edge 30 facing the cylinder drum 7 on the inner ring 5c of the roller bearing 5a.

The spray jet lubrication system preferably comprises a plurality of lubricant spray jets 51a, 51b, which are distributed over the periphery of the axial edge 30 to provide adequate lubrication and cooling of the axial edge 30. In FIGS. 1 to 3, only two lubricant spray jets 51a, 51b, are shown, which lie in the sectional plane of the illustration. It goes without saying that additional lubricant spray jets can be provided. The lubricant spray jets 51a, 51b can be distributed over the periphery at equal angular intervals. Alternatively, it is possible to locate at least some of the lubricant spray jets 51a, 51b closer together in the peripheral direction in angular areas in which higher stresses occur on the axial edge 30, and to locate at least some of the lubricant spray jets 51a, 51b farther from one another in angular areas in which lower stresses occur on the axial edge 30.

For generation of the individual lubricant spray jets 51a, 51b, for each of them there is a boring 55a, 55b pressurized with lubricant located in the housing 2, which is inclined and is, therefore, at an angle to the axis of rotation 6 of the drive shaft 4. The borings 55a, 55b are inclined toward the axial edge 30 on the inner ring 5c of the roller bearing 5a and are oriented toward the point between the end surface 31 of the roller bodies W1 and the axial edge 30 on the inner ring 5c. The lubricant spray jets 51a, 51b exiting the respective borings 55a, 55b are, therefore, directed by the housing side borings 55a, 55b radially inwardly toward the axial edge 30. This results in a targeted lubrication and cooling of the axial edge 30 on the inner ring 5c between the end surface 31 of the roller bodies W1 and the axial edge 30 and a sufficient supply of lubricant at this point by the individual lubricant spray jets 51a, 51b.

The borings 55a, 55b are connected to the lubricant inlet 40. The borings 55a, 55b of the spray jet lubrication system 50 are connected to the lubricant channel 41-47 of the basic lubrication system that runs through the bearing system 5 in a parallel circuit to the lubricant supply connection 40, so that cooled lubricant, such as lubricating oil from a reservoir, is sprayed via the borings 55a, 55b on the axial edge 30.

The borings 55a, 55b are located in a ring bushing 60 fastened in the housing 2. The borings 55a, 55b are connected with the lubricant inlet 40 and the lubricant is distributed to the individual borings 55a, 55b by a ring channel 61 in communication with the lubricant supply connection 40. The ring channel 61 in the illustrated embodiment is arranged in the housing 2. It goes without saying that alternatively, the ring channel 61 can also be located on the outside periphery of the ring bushing 60.

The ring bushing 60 is located in the vicinity of the drive flange 3. Between the inside diameter of the ring bushing 60 and the outside diameter of the drive flange 3, there is an annular gap which forms the discharge (outflow) opening 47 of the lubricant channel 41-47 that runs through the hydrostatic axial piston machine, including the bearing device 5.

Figure 6:
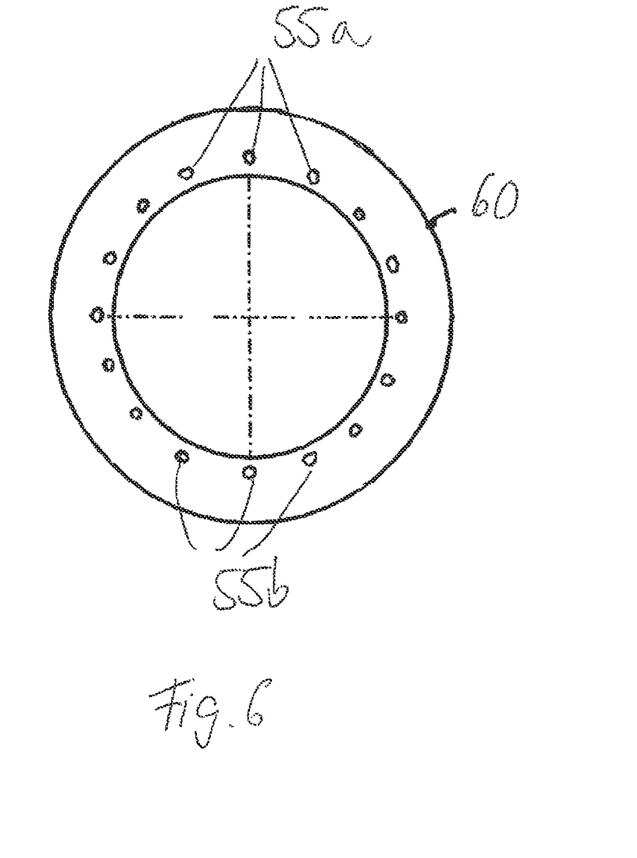
FIG. 6 is a plan view of a bushing ring of the axial piston machine of FIG. 1 with borings having a circular cross section in an arrangement according to another aspect of the disclosure.
Figure 7:
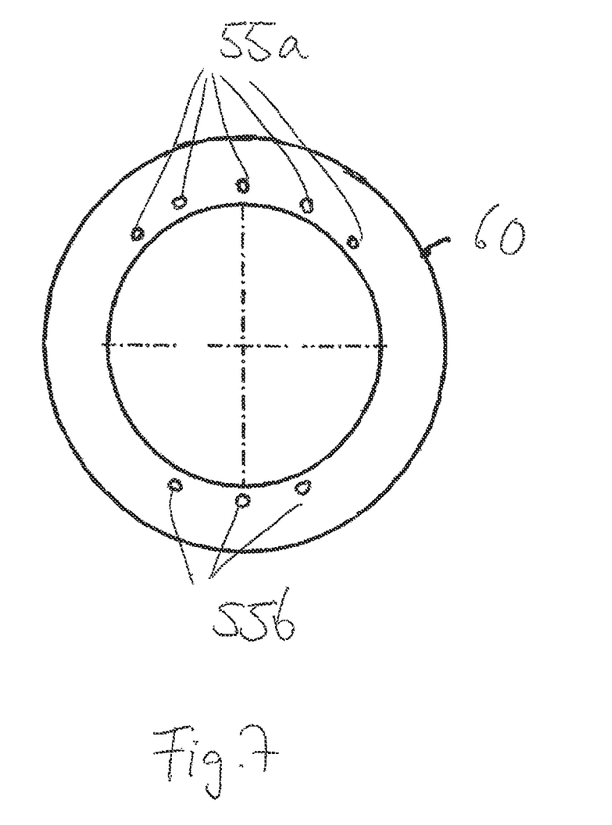
FIG. 7 is a plan view of a bushing ring of the axial piston machine of FIG. 1 with borings having a circular cross section in an arrangement according to another aspect of the disclosure.

The borings 55a, 55b can have a circular cross-section, whereby the lubricant spray jets 51a, 51b that exit via the borings 55a, 55b have an essentially circular cross-section.

Figure 4:
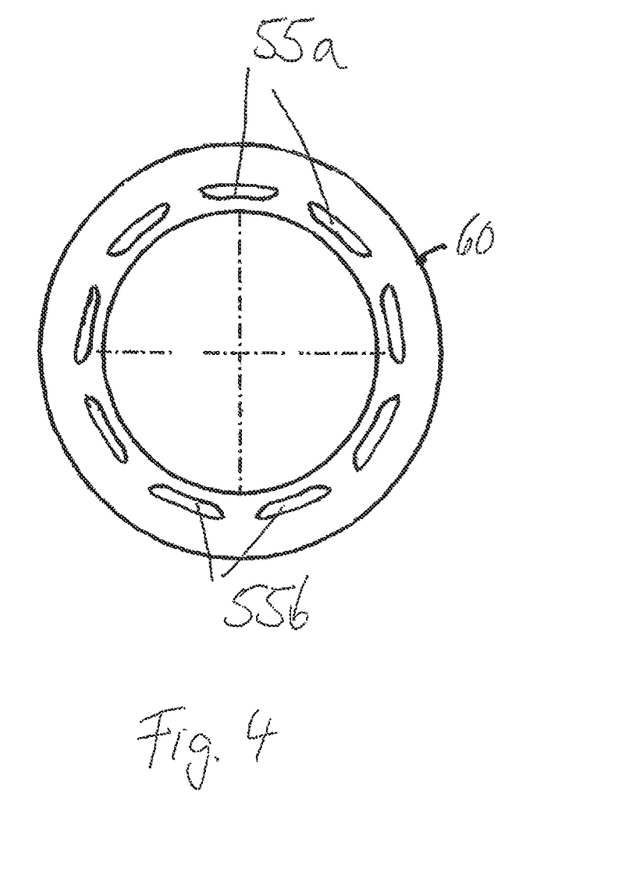
FIG. 4 is a plan view of a bushing ring of the axial piston machine of FIG. 1 with borings having a non-circular cross section in an arrangement according to one aspect of the disclosure.
Figure 5:
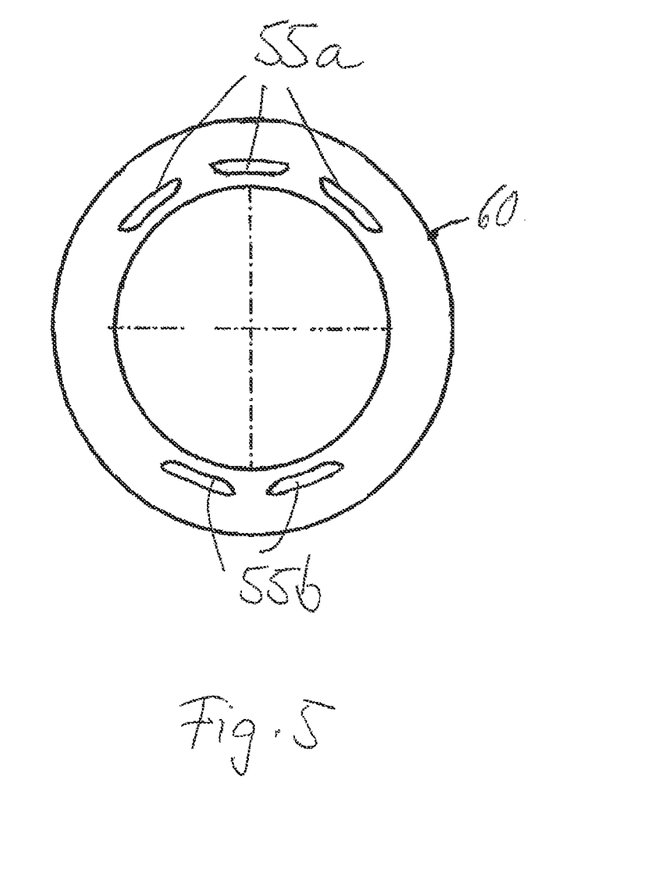
FIG. 5 is a plan view of a bushing ring of the axial piston machine of FIG. 1 with borings having a non-circular cross section in an arrangement according to another aspect of the disclosure.

To achieve lubricant spray jets 51a, 51b with a wider and fan-shaped cross-section, which sprays an expanded angular area on the axial edge 30 with lubricant, the borings 55a, 55b can alternatively be provided with a noncircular cross-section, for example, a cross-section which is slot-shaped or kidney-shaped in the peripheral direction.

The axial piston machine 1 of the invention has a series of advantages. The spray jet lubrication 50 with the lubricant spray jets 51a, 51b directed at the point between the end surface 31 of the roller bodies W1 and the axial edge 30 of the roller bearing 5a makes it possible to provide an adequate supply of lubricant to the roller bearing 5a and a targeted lubrication of the most highly stressed points of the bearing device 5 formed by the two roller bearings 5a, 5b. This configuration makes possible an operation of the axial piston machine 1 with a housing 2 from which the hydraulic fluid has been emptied, to eliminate churning losses of the rotating cylinder drum. As a result of the spray jet lubrication system 50 on the axial edge 30 of the roller bearing 5a, the lubricant volume flow of the lubricant channel 41-47 that runs through the bearing device 5 can also be reduced. As a result of which, the churning losses of the roller bearings 5a, 5b can be reduced.

The invention is not limited to the exemplary illustrated embodiment. Alternatively, or in addition to the spray jet lubrication 50 on the axial edge 30 facing the cylinder drum 7 of the roller bearing 5a facing the cylinder drum 7, a spray jet lubrication system 50 can also be provided on the axial edge 32 of the roller bearing 5b facing the shaft end of the drive shaft 4 projecting out of the housing 2.

The axial piston machine 1 of the invention can be in the form of a pump or a motor.

Alternatively, to the configuration as a variable displacement machine, the axial piston machine 1 can also be in the form of a constant displacement machine with a constant displacement volume.

In addition, with the spray jet lubrication system 50 of the invention in an axial piston machine utilizing a swashplate construction with a housing from which the hydraulic fluid has been removed, an effective cooling and lubrication of the axial edges of the roller bearings that support the drive shaft and the cylinder drum in the housing can be achieved.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic axial piston machine, comprising:
a housing;
a drive shaft rotatably mounted in the housing by a bearing device comprising two roller bearings;
a cylinder drum operatively connected to the drive shaft and comprising at least one piston bore;
a longitudinally displaceable piston located in each piston bore defined in the cylinder drum;
a spray jet lubrication system for at least one of the roller bearings, the spray jet lubrication system being located in the housing, the spray jet lubrication system comprising at least one pressurized lubricant spray jet axially positioned between at least the one of the roller bearings and the cylinder drum and directed toward an area adjacent an inner axial edge of an inner ring of the one of the roller bearings with which roller bodies of the one of the roller bearings are in contact via an end surface, and a lubricant passage connected to the spray jet lubrication system via a lubricant supply connection, being a part of the housing, the lubricant passage having an outlet provided between the two roller bearings, the lubricant passage being a part of the housing.

2. The hydrostatic axial piston machine as recited in claim 1, wherein the spray jet lubrication system is located adjacent an axial edge of the roller bearing facing the cylinder drum.

3. The hydrostatic axial piston machine as recited in claim 1, wherein the spray jet lubrication system comprises a plurality of lubricant spray jets located over a periphery of the inner ring of the one of the roller bearings and oriented toward the axial edge of the inner ring of the one of the roller bearings.

4. The hydrostatic axial piston machine as recited in claim 3, wherein the lubricant spray jets are distributed uniformly over the periphery.

5. The hydrostatic axial piston machine as recited in claim 3, wherein the lubricant spray jets are distributed non-uniformly over the periphery.

6. The hydrostatic axial piston machine as recited in claim 1, wherein a boring directed toward the axial edge of the inner ring of the one of the roller bearings is provided for generation of the at least one lubricant spray jet, which boring is in communication with the lubricant supply connection of the housing.

7. The hydrostatic axial piston machine as recited in claim 6, wherein the boring has a circular cross-section.

8. The hydrostatic axial piston machine as recited in claim 6, wherein the boring has a non-circular cross-section.

9. The hydrostatic axial piston machine as recited in claim 8, wherein the boring has a slot-shaped cross-section oriented in the peripheral direction.

10. The hydrostatic axial piston machine as recited in claim 6, wherein the boring is located in a ring bushing located in the housing, wherein a ring channel provides a connection of the boring with the lubricant supply connection of the housing.

11. The hydrostatic axial piston machine as recited in claim 1, wherein the hydrostatic axial piston machine includes a lubricant channel at least routed through the bearing device, wherein the lubricant passage is connected to the lubricant channel.

12. The hydrostatic axial piston machine as recited in claim 1, wherein the axial piston machine is a swashplate machine.

13. The hydrostatic axial piston machine as recited in claim 1, wherein the axial piston machine is a bent-axis machine.

* * * * *